United States Patent
Koga et al.

(10) Patent No.: US 9,702,034 B2
(45) Date of Patent: Jul. 11, 2017

(54) ROLL FOR MOLTEN METAL PLATING BATH AND METHOD FOR MANUFACTURING THE SAME

(75) Inventors: Shinichi Koga, Sakai (JP); Taizo Matsuda, Sakai (JP); Eisuke Ogawa, Kitakyushu (JP); Makoto Sasaki, Kumagaya (JP)

(73) Assignees: HITACHI METALS, LTD., Tokyo (JP); NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 14/001,831

(22) PCT Filed: Mar. 12, 2012

(86) PCT No.: PCT/JP2012/056249
§ 371 (c)(1),
(2), (4) Date: Sep. 6, 2013

(87) PCT Pub. No.: WO2012/128095
PCT Pub. Date: Sep. 27, 2012

(65) Prior Publication Data
US 2014/0020622 A1    Jan. 23, 2014

(30) Foreign Application Priority Data
Mar. 24, 2011    (JP) .................. 2011-065716

(51) Int. Cl.
*B05C 3/132*    (2006.01)
*C23C 2/00*    (2006.01)
(Continued)

(52) U.S. Cl.
CPC ............ *C23C 2/003* (2013.01); *B05C 1/0808* (2013.01); *B05C 1/12* (2013.01); *B05C 3/125* (2013.01);
(Continued)

(58) Field of Classification Search
CPC ..... B05C 17/0247; B05C 1/0808; B05C 1/12; B05C 3/125; B05C 3/132; C23C 2/003;
(Continued)

(56) References Cited

U.S. PATENT DOCUMENTS 4,996,113 A * 2/1991 Hector et al. ................ 428/600
5,391,135 A * 2/1995 Kuroki et al. ................ 492/35
(Continued)

FOREIGN PATENT DOCUMENTS

JP    58-51562 A    5/1981
JP    4-301057 A    10/1992
(Continued)

OTHER PUBLICATIONS

International Search Report issued in PCT/JP2012/056249, dated Apr. 3, 2012.

*Primary Examiner* — Laura Edwards
(74) *Attorney, Agent, or Firm* — Birch, Stewart, Kolasch & Birch, LLP

(57) ABSTRACT

A roll for a hot-dip metal coating bath has a substantially cylindrical shape. At least an outer peripheral surface of the roll is formed of a ceramic material. A relatively coarse groove is formed on the outer peripheral surface of the roll in a direction crossing the rotation axis. A plurality of relatively fine grooves is formed in the bottom surface of the coarse groove along the longitudinal direction of the coarse groove. In place of the fine grooves extending in the longitudinal direction of the coarse groove, a plurality of rows of fine grooves may be formed along the crosswise direction of the coarse groove.

8 Claims, 13 Drawing Sheets

(51) Int. Cl.
*B05C 17/02* (2006.01)
*B05C 3/12* (2006.01)
*B05C 1/12* (2006.01)
*B05C 1/08* (2006.01)
*B65G 39/09* (2006.01)
*B22D 11/06* (2006.01)
*B65G 49/04* (2006.01)

(52) U.S. Cl.
CPC .......... *B05C 17/0247* (2013.01); *B05C 3/132* (2013.01); *B22D 11/0651* (2013.01); *B65G 39/09* (2013.01); *B65G 49/0404* (2013.01); *B65G 49/0413* (2013.01)

(58) Field of Classification Search
CPC ............. B22D 11/0651; B22D 11/0682; F16C 17/026; F16C 33/107; F16C 2240/42; B65G 39/09; B65G 49/0404; B65G 49/0413
USPC .......... 118/500, DIG. 14, DIG. 15, 423, 424, 118/426, 428; 492/35, 30, 34, 37; 29/895.32; 164/423, 428, 429, 443; 384/114
See application file for complete search history.

(56) References Cited

U.S. PATENT DOCUMENTS 5,797,827 A * 8/1998 Sondergeld .................... 492/37
5,835,124 A * 11/1998 Fukita et al. ................. 347/260
6,089,756 A * 7/2000 Ono ......................... F16C 9/00
                                                                                       384/283

FOREIGN PATENT DOCUMENTS

| JP | 5-306441 A | | 11/1993 |
|----|------------|---|---------|
| JP | 7-62510 | * | 3/1995 |
| JP | 7-62510 A | | 3/1995 |
| JP | 7-305155 A | | 11/1995 |
| JP | 2000-248345 A | | 9/2000 |
| JP | 2003-55782 A | | 2/2003 |

\* cited by examiner (a)

(b)

(c)

(a)

(b)

(b)

(c)

ROLL FOR MOLTEN METAL PLATING BATH AND METHOD FOR MANUFACTURING THE SAME

TECHNICAL FIELD

The present invention relates to a roll for hot-dip metal coating bath at least an outer peripheral surface of which is formed of a ceramic material, and which has a body, being substantially cylindrical in appearance, and a method for manufacturing the same.

BACKGROUND ART

As a roll for hot-dip metal coating bath relating to the above-described technical field, there is available a roll for hot-dip metal coating bath that is used, being dipped in the coating bath of a hot-dip metal coating apparatus on a metal coated steel sheet manufacturing line for producing a metal coated steel sheet by forming a metal coating layer of zinc or aluminum on a surface of a steel sheet, and a piece of prior art relating to the roll for hot-dip metal coating bath is disclosed in the following Patent Document 1.

In the above-described Patent Document 1, there is disclosed a high-grip roll for use in liquid that, as a roll for hot-dip metal coating bath, is provided with a spiral groove or, otherwise, a plurality of annular grooves on the outer peripheral surface of a roll main body made of a metal or an inorganic substance, the geometry of the groove satisfying a predetermined mathematical expression.

CITATION LIST

Patent Literature

Japanese Unexamined Patent Application Publication No. 2003-55782

DISCLOSURE OF THE INVENTION

Problems to be Solved by the Invention

The roll for hot-dip metal coating bath that is a rotating member for hot-dip metal coating bath that is disclosed as a high-grip roll for use in liquid in the above-mentioned Patent Document 1 is excellent in that it can cause a steel sheet to be tightly contacted with the surface thereof, conveying the steel sheet with no slippage, that it allows a metal coating layer to be formed with no pattern due to slippage being produced, and that it is formed of a metal or an inorganic substance, having an extended period of life. However, from the viewpoint of improvement in quality of hot-dip metal coating steel sheets and cost reduction therefor, a further improvement is being demanded for the roll for hot-dip metal coating bath.

The present invention is an invention made in view of such a demand and offered as a great effort exerted by the inventors of the present application, and it is an object of the present invention to provide a roll which has achieved a further improvement, as compared to the piece of prior art, and a method for manufacturing the same.

Means for Solving the Problems

According to a first aspect of the present invention in order to solve the aforementioned problems, there is provided a roll for hot-dip metal coating bath having a body with a substantially cylindrical appearance, at least an outer peripheral surface thereof being formed of a ceramic material, including: on the outer peripheral surface of the body, there being formed a groove in a direction crossing the rotation axis; and in the bottom surface of the groove, there being formed a plurality of rows of a fine groove along the longitudinal direction of the groove. In this aspect, it is preferable that the fine groove have an aperture width of 50 to 500 μm.

According to a second aspect of the present invention in order to solve the aforementioned problems, there is provided the aforementioned roll for hot-dip metal coating bath, wherein, in place of the fine groove along the longitudinal direction of the groove, there are provided a plurality of rows of a fine groove which are formed along the crosswise direction of the groove. In this aspect, it is preferable that the fine groove have a depth of 30 to 200 μm.

It is desirable that the aforementioned groove have inclined side walls flaring toward the aperture direction thereof in the sectional view along the crosswise direction of the groove, and the side walls may have a shouldered portion.

Further, it is desirable that, on the surface of the aforementioned groove, a glass phase be formed, and further, it is desirable that the top surface of a convex portion between adjacent two of the aforementioned plurality of rows of the fine groove be a substantially plain surface or a substantially semispherical surface.

Further, it is desirable that, in the sectional view of the aforementioned groove along the crosswise direction, a radiused surface be formed in the corner portion of the groove.

Still further, it is desirable that the geometry of the aforementioned groove in the sectional view along the crosswise direction be any one of the substantially rectangular, substantially triangular, substantially letter-U and substantially trapezoidal shapes, a plurality of the grooves being formed in the direction along the rotation axis, and between adjacent grooves of the plurality of grooves, a plain portion being formed, the plain portion having a width of 3 mm or over in parallel to the direction of the rotation axis.

Still further, it is preferable that a plurality of the aforementioned grooves be formed in the direction along the rotation axis, and between adjacent grooves of the plurality of grooves, a plain portion be formed, with an intermediate groove which is shallower than the aforementioned groove being formed in the plain portion, or a plurality of intermediate grooves which are different from the groove in angle at which to cross with the rotation axis being formed on the circumference in the aforementioned plain portion, and the intermediate groove being provided, being not connected with the aforementioned groove.

In addition, it is preferable that the ceramic material forming the body of the aforementioned roll for hot-dip metal coating bath is a silicon nitride-based ceramic material.

According to a third aspect of the present invention, there is provided a method for appropriately manufacturing a roll for hot-dip metal coating bath of the aforementioned aspect, the method being a method for manufacturing a roll having a body with a substantially cylindrical appearance, at least an outer peripheral surface thereof being formed of a ceramic material, and a groove formed on the body so as to cross the rotation axis, including: the first groove formation step of forming a first groove by rotating the body and irradiating a laser beam on the outer peripheral surface of the body along a first scanning line; the second groove formation step of forming a second groove deeper than the first groove by, after the first groove formation step, rotating the body and irradiating the laser beam on the bottom surface of the first groove along a second scanning line, the first scanning line and the second scanning line being different from each other in disposition.

With the aforementioned manufacturing method, the first scanning line and the second scanning line may be both set in the direction along the rotation axis, and in that case, it is preferable that the circumferential speed for the body in the first groove formation step be set so as to be different from that in the second groove formation step.

With the aforementioned manufacturing method, the first scanning line and the second scanning line may be both set in the direction crossing the rotation axis.

Further, it is preferable that, at the end of the groove in the crosswise direction, the energy density per unit area for the laser beam be lowered to form a radiused surface at the end concerned.

Further, it is desirable that the laser machining step be followed by the shot blasting step of providing shot blasting for at least the groove.

In accordance with the present invention, it is possible to solve the aforementioned problems.

BEST MODE FOR CARRYING OUT THE INVENTION

Hereinbelow, the present invention will be explained on the basis of a first embodiment to a fourth embodiment of a roll for hot-dip metal coating bath in accordance with the present invention, with reference to the drawings. In the following explanation, as a rotating member for hot-dip metal coating bath, a roll for hot-dip metal coating bath is used as an example for explanation, however, the present invention is applicable to rolls, rollers, and other rotating members for use in the hot-dip metal coating bath. Further, the respective elements of the present invention that will be explained hereinbelow can be utilized alone or in an appropriate combination, and may be modified as appropriate so long as the modification does not depart from the spirit of the present invention.

[Coated Steel Sheet Manufacturing Line and Hot-Dip Metal Coating Apparatus]

Figure 1:
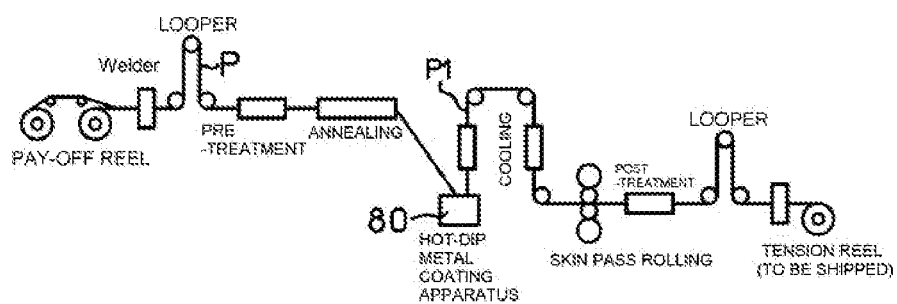
FIG. 1 is a schematic configuration diagram for a coated steel sheet manufacturing line.
Figure 2:
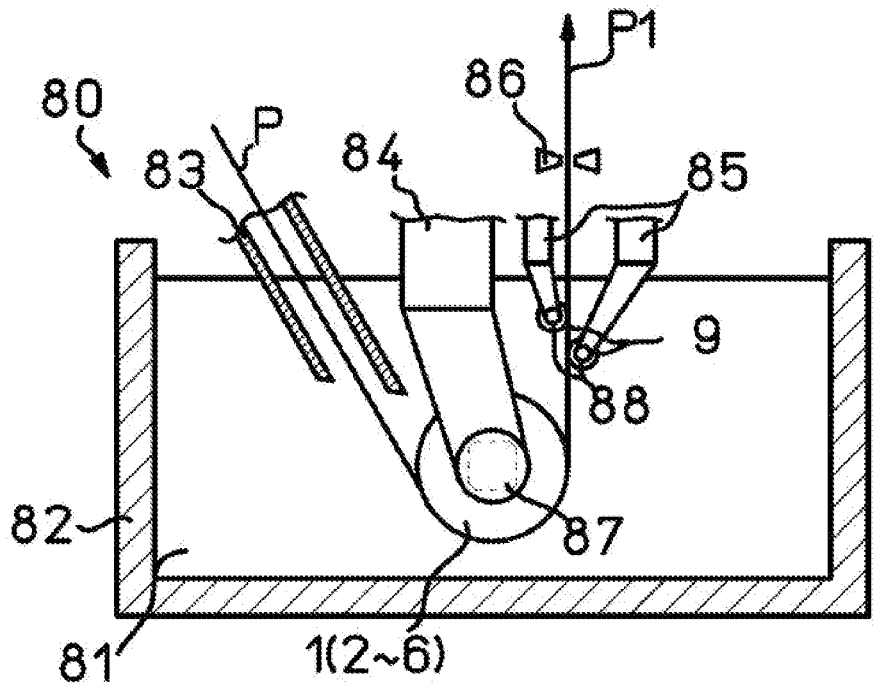
FIG. 2 is a figure illustrating the configuration of an apparatus for hot-dip metal coating bath in FIG. 1.

First, with reference to FIGS. 1 and 2, there will be an explanation about a hot-dip metal coating apparatus in which a sink roll 1 or 2, which is a roll for hot-dip metal coating bath according to a first embodiment or a second embodiment of the present invention, respectively, is used, being dipped in a hot-dip metal coating bath, and a coated steel sheet manufacturing line in which the hot-dip metal coating apparatus is incorporated.

As shown in FIG. 1, the coated steel sheet manufacturing line for manufacturing zinc-coated steel sheets, aluminum coated steel sheets, zinc-aluminum alloy coated steel sheets, or steel sheets coated with other metals is configured such that it pre-treats a steel sheet P pulled out from a hot-rolled acid-pickled coil or a cold-rolled coil loaded on a pay-off reel; performs an annealing treatment for material conditioning; then dips the steel sheet into the hot-dip metal coating bath of a hot-dip metal coating apparatus 80 to provide a steel sheet P1 on the surface of which a molten metal consisting of zinc, aluminum, or an alloy thereof is adhered; thereafter cools the steel sheet P1 for cooling and solidifying the molten metal adhered; passes the steel sheet P1 through a skin pass rolling mill; and winds up the steel sheet P1 on a tension reel for shipment.

FIG. 2 is a sectional view illustrating a schematic configuration of the hot-dip metal coating apparatus 80 for performing hot-dip metal coating in FIG. 1 when viewed from the front thereof. The hot-dip metal coating apparatus 80 includes a tank 82 containing a hot-dip metal coating bath (hereinafter which may be simply referred to as "coating bath") 81; a snout 83 which is dipped into a surface layer portion of the coating bath 81 for preventing oxidation of a steel sheet introduced into the coating bath 81; a sink roll 1 disposed in the coating bath 81; a pair of support rolls 9, 9 positioned above the sink roll 1 or 2 in the coating bath 81; and a gas wiping nozzle 86 positioned slightly above the surface of the coating bath 81. The sink roll 1 itself is not provided with an external driving force, and is driven by the contact friction between it and the steel sheet which is passed. Further, with the support rolls 9, 9, generally, one support roll 9 is a driving roll connected to an external motor (not shown), while the other support roll 9 is a non-driving roll. The support roll 9 may be available as a non-driven type which is not provided with an external driving force. The sink roll 1 as a roll for hot-dip metal coating bath and a pair of support roll 9, 9 are freely rotatably supported by a bearing 87, 88 mounted to a frame 84, 85, respectively, and are dipped always integrally in the coating bath 81.

The steel sheet P is caused to advance into the coating bath 81 from diagonally thereabove through the snout 83, and to change its direction of advance upward through the sink roll 1. The steel sheet P rising in the coating bath 81 is sandwiched between the pair of support rolls 9, 9, thereby the pass line being maintained with occurrence of a warpage or vibrations being prevented. The gas wiping nozzle 86 blows a high-speed gas onto the steel sheet P1 getting out of the coating bath 81. By adjusting the gas pressure and the blowing angle for the high-speed gas, the thickness of the hot-dip metal coating adhered to the steel sheet P1 is adjusted. In this way, the steel sheet P1 which has been provided with a hot-dip metal coating is obtained.

First Embodiment

The configuration of the sink roll (hereinafter which may be simply referred to as the roll) 1, which is incorporated in the coating apparatus 80 in FIG. 2, as a first embodiment of the present invention, will be explained with reference to FIG. 3 as a front view thereof and FIG. 4 as a partially enlarged view of a groove in FIG. 3. Here, the configuration which will be explained using a sink roll as an example is basically applicable to support rolls and other rotating members for hot-dip metal coating bath, and this statement also holds true for a sink roll 2 as a second embodiment, which will be described later.

Figure 3:
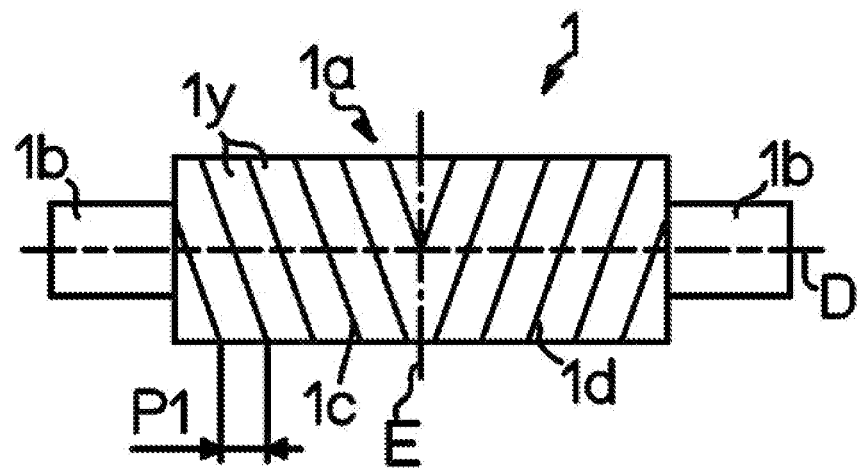
FIG. 3 is a front view illustrating a first embodiment of a roll for hot-dip metal coating bath in FIG. 2.

The roll 1 the front view of which is given in FIG. 3 includes a body 1a which has an outer peripheral surface to be contacted with the steel sheet P shown in FIG. 2, being formed of a ceramic material, and being substantially cylindrical in appearance; and a shaft portion 1b which extends in the horizontal direction from both ends of the body 1a concentrically with the rotation axis D of the body 1a, and is substantially cylindrical in appearance. With the roll 1 of the present embodiment, the body 1a and the shaft portion 1b which are solid, being formed of a ceramic material, are integrally configured with no seams, however, the roll 1 may be configured with the shaft portion 1b made of a ceramic or metallic material being fixed to both ends of the body 1a as a part separate from the body 1a. In such case, from the viewpoint of thermal shock resistance and ease of manufacture, it is desirable that the body 1a and the shaft portion 1b be configured so as to be of a substantially cylindrical shape, having a hollow portion. Further, the body 1a may be configured by directly forming a ceramic layer on the outer peripheral surface of a substantially cylindrical body made of a metal by, for example, thermal spraying, or by fitting a sleeve made of a ceramic material thereto. In other words, for the roll 1 as a rotating member, it is essential that the outer peripheral surface of at least the body 1a which is directly contacted with the molten coating metal and the steel sheet be formed of a ceramic material.

In the outer peripheral surface of the body 1a, a groove 1c, 1d is formed in order to drive out the molten coating metal interposed between the outer peripheral surface and the steel sheet to be in contact therewith, thereby improving the adherence of the steel sheet to the body 1a. This groove 1c, 1d also plays a role of simultaneously driving out the sludge contained in the molten coating metal, thereby suppressing occurrence of a defect in the metal coating layer that is due to the sludge.

Herein, the pair of grooves 1c, 1d are both formed in a preferable geometry in a direction crossing the rotation axis D of the roll 1. In other words, one groove 1c, which is disposed on the left side of the center line E of the body lain a direction along the rotation axis D (hereinafter to be referred to as the axial direction), is formed as a spiral which orbits in a clockwise direction when the body 1a is viewed from the end of the left-side shaft portion 1b in the axial direction, while the other groove 1d, which is disposed on the right side of the center line E of the body 1a, is formed as a spiral orbiting counterclockwise when the body 1a is viewed from the end of the right-side shaft portion 1b in the axial direction, such that it is axially symmetrical to the one groove 1c about the center line E. As with these grooves 1c, 1d which have a preferable geometry, by disposing the grooves 1c, 1d bilaterally symmetrically about the center line E of the body 1a in the axial direction, the molten coating metal and the sludge (a foreign matter) such as the dross can be effectively driven out of the body 1a, and in addition the contact position between the steel sheet and the body 1a in the axial direction can be maintained at the middle position, whereby occurrence of a slippage of the steel sheet in the axial direction that can cause a pattern or a flaw on the metal coated steel sheet surface can be suppressed.

Figure 4A:
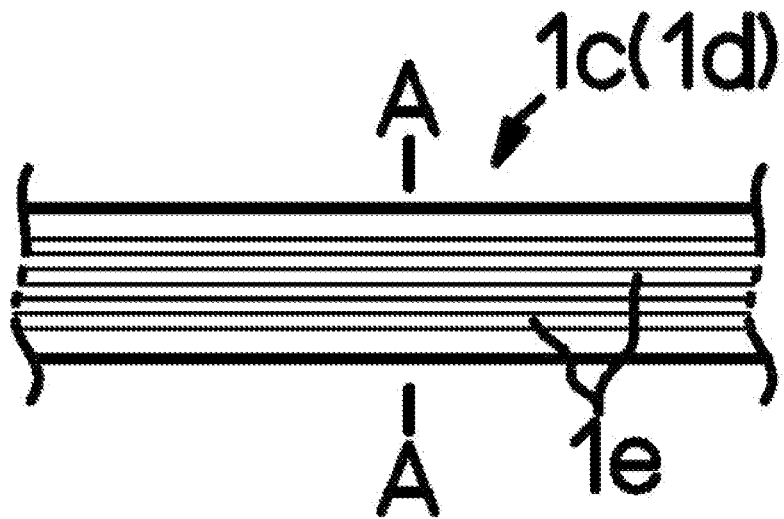
FIG. 4(a) is a partially enlarged front view of a groove in the roll for hot-dip metal coating bath in FIG. 3.
Figure 4B:
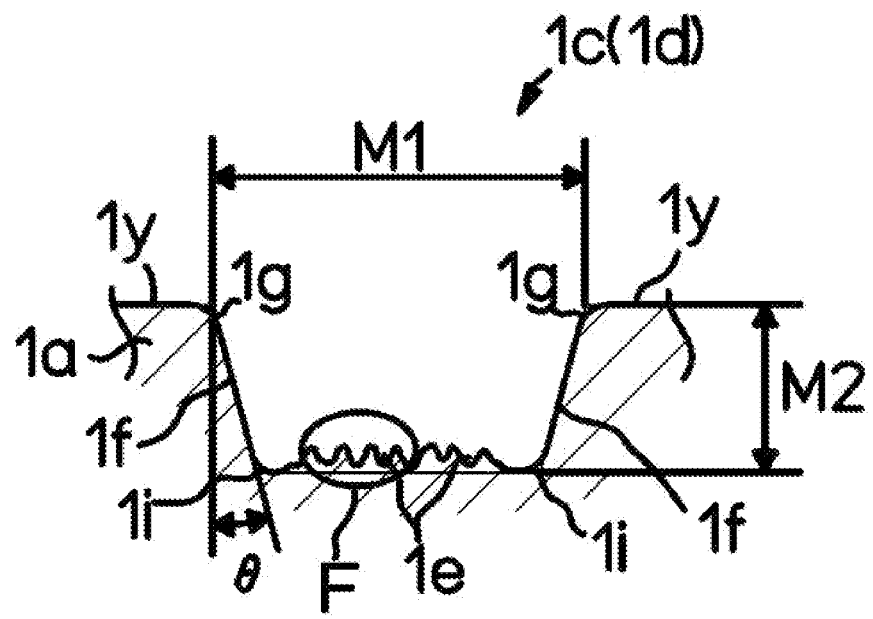
FIG. 4(b) is a sectional view taken on the line A-A in FIG. 4(a)

As shown in FIG. 4(a), which is an enlarged plan view of the groove 1c, 1d in FIG. 3, and FIG. 4(b), which is a sectional view taken along the line A-A in FIG. 4(a), a plurality of rows of a fine groove 1e are formed in the bottom surface of the groove 1c, 1d along the longitudinal direction of the groove 1c, 1d. In FIG. 4(a), the fine grooves 1e are expressed using linear lines for ease of comprehension, however, they may be curved, provided that the rows of the fine groove 1e are in parallel to one another. As is evident from the illustration of FIG. 4(b), the coarse groove 1c, 1d has a width greater than the combined width of the plurality of fine grooves 1e.

As shown in FIG. 4(b), which is a sectional view of the groove 1c, 1d in the crosswise direction, the groove 1c, 1d has two side walls 1f, 1f which rise from both ends of the bottom surface thereof toward the aperture of the groove 1c, 1d and connect to the circumferential surface of the body 1a. These side walls 1f, 1f may be formed such that they rise vertically from the bottom surface in the sectional view. However, from the viewpoints of (1) increasing the thermal shock resistance for suppressing occurrence of a fracture of the body 1a by increasing the angle of the corner at a point of intersection between the side wall 1f, 1f and the bottom surface, and (2) more rapidly driving out the molten coating metal and the sludge from the surface of the body 1a by increasing the sectional area of the groove 1c, 1d for increasing the flow velocity of the molten coating metal, it is desirable that, as shown in FIG. 4(b), the side walls 1f, 1f be provided as inclined surfaces flaring toward the aperture in the sectional view in the crosswise direction.

In addition, in the groove 1c, 1d in the present embodiment, a connection surface 1g, 1g is formed, as a preferable element, which is interposed between the above-mentioned side wall 1f, 1f and a plain surface 1y, which is the circumferential surface of the body 1a, for connecting both to each other. The connection surface 1g, 1g is a face configured so as to eliminate the existence of a sharp corner at a point of intersection between the side wall 1f, 1f and the circumferential surface of the body 1a that might otherwise cause a flaw to be produced on the steel sheet to be contacted with the plain surface 1y of the body 1a. And, the connection surface 1g, 1g in the present embodiment is a radiused surface which smoothly connects between the side wall 1f, 1f and the circumferential surface of the body 1a, however, it may be a chamfered surface. Such connection surface 1g, 1g is formed preferably in the shot blasting step later described.

Further, since the coating bath is heated at a temperature as high as, for example, 450° C. for hot-dip zinc coating, a thermal stress due to the rapid heating and cooling is imposed on the roll 1 at the time of dipping it into the coating bath and withdrawing it therefrom, respectively, and therefore if the groove 1c, 1d has a sharp corner at the bottom surface, the groove 1c, 1d may be fractured from the corner as a fracture origin. Therefore, as shown in FIG. 4(b), the groove 1c, 1d in the present embodiment is provided with a radiused surface 1i at the corner in the sectional view in the crosswise direction. Such radiused surface 1i is preferably formed by adjusting the laser machining conditions only at the end of the groove 1c, 1d as later described.

Figure 4C:
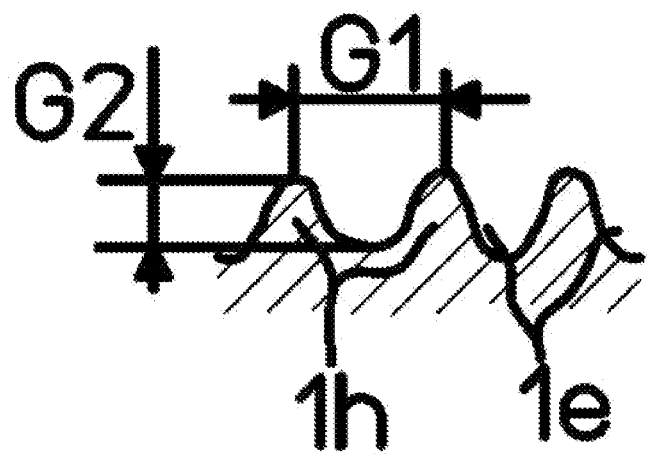
FIG. 4(c) is an enlarged view of a portion F in FIG. 4(b)

The plurality of rows of the fine groove 1e which are provided in parallel to one another in the bottom surface of the groove 1c, 1d serve to rectify the streamline of the molten coating metal flowing in the groove 1c, 1d, thereby causing the molten coating metal and the sludge contained therein to smoothly flow in the groove 1c, 1d to be rapidly driven out of the body 1a. Such fine groove 1e will be described in detail with reference to FIG. 4(c), which is an enlarged sectional view of an F-portion in FIG. 4(b). As shown in FIG. 4(c), the sectional geometry along the crosswise direction of each of the plurality of fine grooves 1e, which are concave portions provided in parallel to one another, is, in general, substantially rectangular, or otherwise substantially trapezoidal or substantially triangular, the groove width being decreased downward (in a direction toward the side opposite to the aperture of the fine groove 1e), however, the shape, dimensions, disposed position, and other geometrical elements of the individual fine grooves 1e need not always be identical. In other words, as shown in FIG. 4(c), it is essential that the plurality of rows of the fine groove 1e having a concaved shape be formed along the longitudinal direction in the bottom surface of the groove 1c, 1d such that they provide the above-described function and effects, and the geometry, size, and disposed position with respect to the side walls or in the bottom surface of the individual fine grooves 1e may be non-uniform. Further, the fine grooves 1e need not be disposed in a closely located state through a convex portion 1h, and may be disposed such that they are separated from one another with a broad spacing being given through the convex portion 1h having a wide top surface. However, from the viewpoint of rectifying the streamline of the molten coating metal as described above, each of the fine grooves 1e has preferably an aperture width of 500 μm or under. On the other hand, in order to prevent the groove 1c, 1d being clogged by trapping a minute foreign matter such as the sludge contained in the molten coating metal, each of the fine grooves 1e has preferably an aperture width of 50 μm or over. Here, the aperture width of the fine groove 1e refers to a distance across the tops of the convex portions 1h formed at both ends of the fine groove 1e in the crosswise direction that is indicated with a symbol of G1 in FIG. 4(c).

Further, the top surface of the convex portion 1h which is interposed between the adjacent fine grooves 1e provided in parallel to each other in the longitudinal direction may be formed with an acute angle, however, it is desirable that, in order to prevent the top surface from trapping a foreign matter, such as the sludge contained in the molten coating metal, the top surface be a substantially plain surface or substantially semispherical surface which is smooth. Such a surface is preferably formed in the shot blasting step later described. Further, in order to suppress occurrence of an erosion of the surface of the groove 1c, 1d due to the reaction to the molten coating metal flowing in the groove 1c, 1d, it is desirable that a glass phase be formed on the surface of the groove 1c, 1d. Such a glass phase can be appropriately formed by the later described groove machining step using the laser beam.

Further, in order to enhance the adherence of the steel sheet to the body 1a, it is desirable that the geometry of the groove 1c, 1d shown in FIG. 3 in the sectional view along the crosswise direction be anyone of the substantially rectangular, substantially triangular, substantially letter-U and substantially trapezoidal shapes, and the width of the plain portion 1y formed between the adjacent grooves 1c, 1d in the crosswise direction is 3 mm or over.

Second Embodiment

Figure 5:
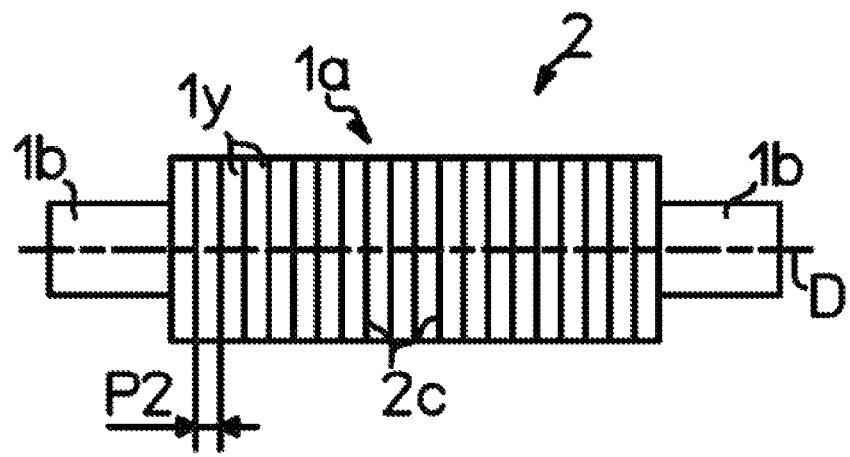
FIG. 5 is a front view illustrating a second embodiment of the roll for hot-dip metal coating bath in FIG. 2.

The configuration of a sink roll 2, which is a second embodiment of the present invention, being incorporated in the coating apparatus 80 in FIG. 2 in place of the sink roll 1 in the above-described first embodiment will be explained with reference to FIG. 5, which is a front view thereof, and FIG. 6, which is a partially enlarged view of the groove in FIG. 5. In FIGS. 5 and 6, the same component as that of the sink roll 1 in the above-described first embodiment will be provided with the same symbol, and detailed explanation thereabout will be omitted.

The roll 2 in the second embodiment has the same body 1a and shaft portion 1b as those of the roll 1 in the above-described first embodiment, but, a groove 2c formed in the outer peripheral surface of the body 1a thereof differs from the groove 1c, 1d of the roll 1 in that it is formed in a direction orthogonal to the rotation axis D when viewed from the front, providing an annular geometry when viewed from the axial direction, and further along the axial direction, a plurality of rows of the groove 2c are disposed with a substantially equal spacing. It is not essential to provide the plurality of rows of the groove 2c along the axial direction with an equal spacing, and for example, the grooves 2c may be provided with a fine spacing on the end sides of the body 1a, while with a rough spacing in the middle portion, or vice versa. Further, the grooves 2c may be disposed in an inclined direction with respect to the rotation axis D rather than in an orthogonal direction. Further, the groove 2c in the present embodiment and the spiral groove 1c, 1d of the above-described roll 1 may be formed in combination in the body 1a.

Figure 6A:
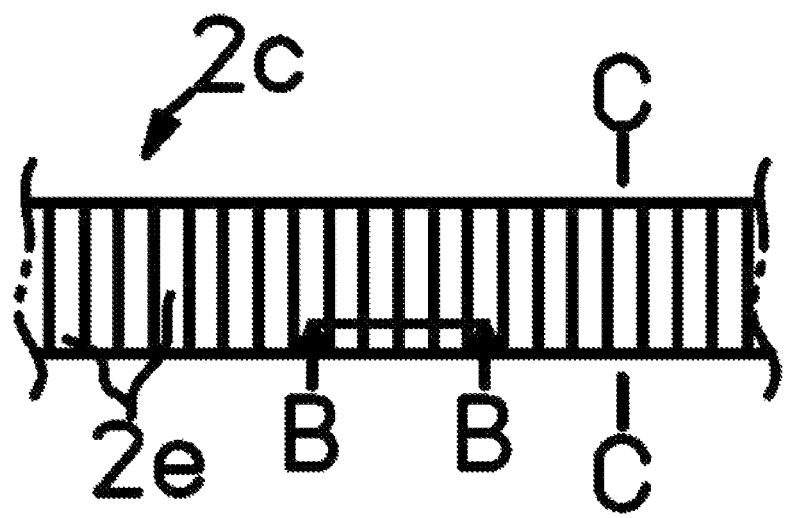
FIG. 6(a) is a partially enlarged front view of a groove in the roll for hot-dip metal coating bath in FIG. 5.
Figure 6B:
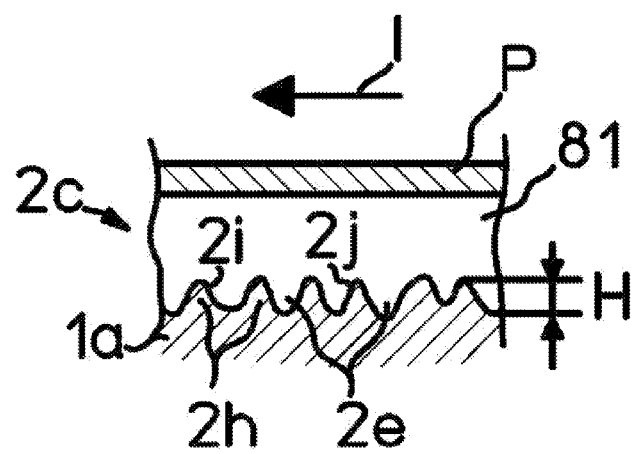
FIG. 6(b) is a sectional view taken along the line B-B in FIG. 6(a)

As shown in FIG. 6(a), which is an enlarged plan view of the groove 2c in FIG. 5; FIG. 6(b), which is a view in the direction of the arrow B in FIG. 6(a); and FIG. 6(c), which is a sectional view taken along the line C-C in FIG. 6(a), a plurality of rows of a fine groove 2e are formed in the bottom surface of the groove 2c along the crosswise direction thereof. In FIG. 6(a), the fine grooves 2e are expressed using linear lines for ease of comprehension, however, they may be curved, provided that the rows of the fine groove 2e are in parallel to one another. Further, the fine grooves 2e need not be formed in parallel to one another with respect to the crosswise direction of the groove 2c, and so long as they provide the function and effects described below, they may be disposed, being inclined.

Figure 6C:
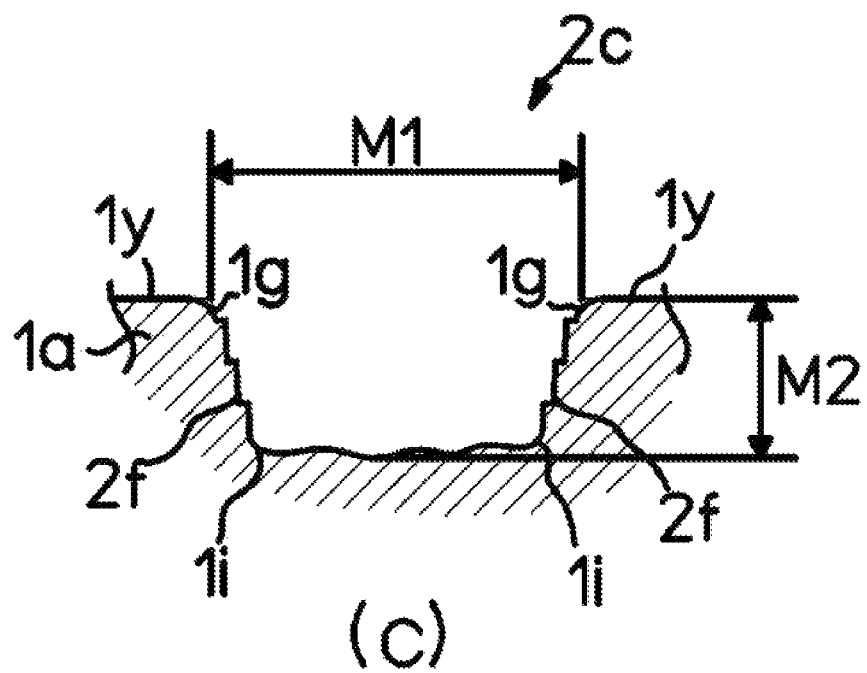
FIG. 6(c) is a sectional view taken along the line C-C in FIG. 6(a)

As shown in FIG. 6(c), which is a sectional view along the crosswise direction, the groove 2c has side walls 2f, 2f which rise from both ends of the bottom surface thereof, and a connection surface 1g which connects between the side wall 2f, 2f and the circumferential surface of the body 1a. And, like the side walls 1f, 1f of the groove 1c, 1d of the above-described roll 1, the side walls 2f, 2f are formed so as to flare upward, however, the side walls 2f, 2f are different from the side walls 1f, 1f in that they are formed of a plurality of shouldered portions. In this way, by preferably providing the side walls 2f, 2f with shouldered portions, the side walls 2f, 2f which slowly flare from the bottom surface of the groove 2c toward the outer peripheral surface of the body 1a can be formed, thereby the stress concentration on the connection surface 1g of the groove 2c can be released to a higher degree. Further, with the surface area of the groove 2c being increased, it can be prevented that the groove 2c traps a minute foreign matter, such as the sludge, resulting in the groove 2c being clogged.

Here, the plurality of rows of the fine groove 2e, which are provided in parallel to one another in the bottom surface of the groove 2c, have a capability of forcing out the molten coating metal having flown into the groove 2c with their side faces as if the blades of a waterwheel, thereby rapidly driving out the molten coating metal and the sludge contained therein to the outside of the body 1a. In other words, as shown in FIG. 6(b), the fine groove 2e, which is formed with basically the same elements as those of the fine groove 1e of the above-described roll 1 except for the direction of disposition, has side faces 2i and 2j (which are also side faces of a convex portion 2h) in the sectional view in the longitudinal direction. And, when the roll is rotated in the direction of the arrow indicated with a symbol of I in the figure, the side face 2j, which is located on the side opposite to the direction of the rotation, will force out the molten metal of the coating bath 81 that has flown into the groove 2c. The molten metal of the coating bath 81 that has been forced out is caused to flow in the passage-like space formed by the steel sheet P in contact with the outer peripheral surface of the body 1a and the groove 2c, and with the steel sheet P being left from the body 1a, is driven out from the aperture of the groove 2c to the outside of the body 1a. In order to cause the fine grooves 2e shown in FIG. 6(b) to exert the capability of forcing out the molten metal, it is preferable that they each have a depth of 30 μm or over. On the other hand, in order to avoid occurrence of a fracture of the body 1a due to a thermal shock in the portion where the wall thickness is abruptly changed, it is preferable that the fine grooves 2e each has a depth H of 200 μm or under. Here, the depth of the fine groove 2e refers to a distance from the apex of the fine groove 2e to the bottom surface, which is indicated with a symbol of H in FIG. 6(b).

Third Embodiment

The configuration of a sink roll 3, which is a third embodiment of the present invention, being incorporated in the coating apparatus 80 in FIG. 2 in place of the sink roll 1 in the above-described first embodiment will be explained with reference to FIG. 9, which is a front view only of the body thereof. In FIG. 9, the same component as that of the sink roll 1 or 2 in the above-described first or second embodiment will be provided with the same symbol, and detailed explanation thereabout will be omitted (this statement is also applicable to a sink roll in the fourth embodiment which will be described later).

Figure 9A:
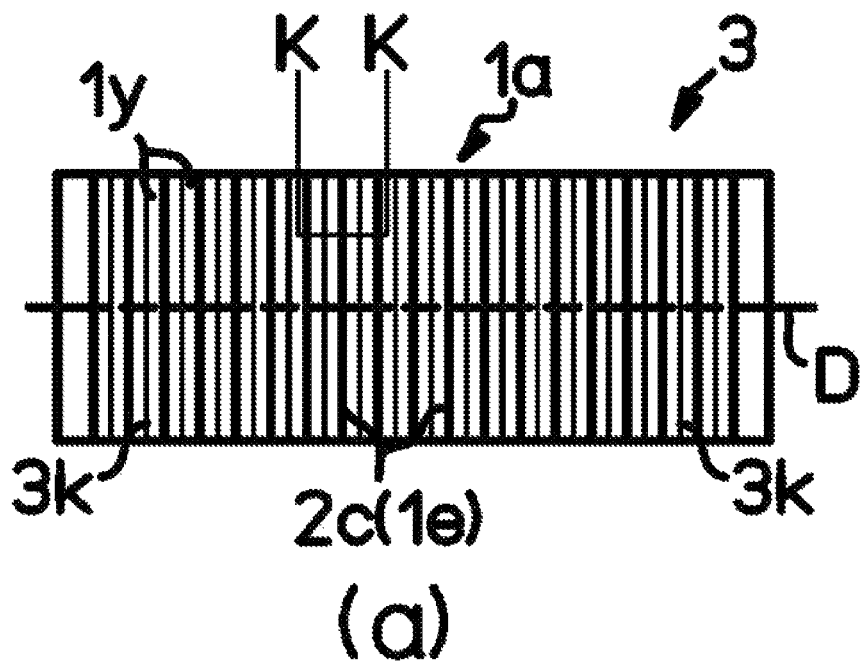
FIG. 9(a) is a front view of a body in a third embodiment of the roll for hot-dip metal coating bath in FIG. 2.
Figure 9B:
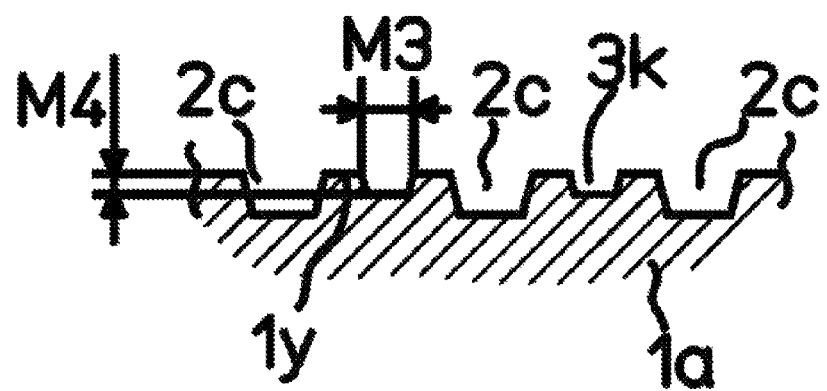
FIG. 9(b) is a sectional view taken along the line K-K in FIG. 9(a)

As shown in FIG. 9(a), which is a front view only of the body 1a of the roll 3 in the third embodiment, the roll 3 has a plurality of the same grooves 2c as those of the roll 2 in the second embodiment that are formed in the body 1a along the axial direction thereof, but is different from the roll 2 in the second embodiment in that it has one row of an intermediate groove 3k in the middle of a plain portion 1y which is indicated with a thin line in the figure, being provided between the adjacent grooves 2c. In the groove 2c (hereinbelow, in the explanation of the roll in the third embodiment, the "groove 2c" will be referred to as the "main groove 2c" for ease of comprehension, this statement being also applicable to the roll in the fourth embodiment which will be explained later), in place of the fine grooves 2e which are provided for the roll 2 in the above-described second embodiment in the crosswise direction, the fine grooves 1e which are provided for the roll 1 in the first embodiment along the longitudinal direction are formed. Here, with the roll 3 in the present embodiment, there are provided a plurality of rows of the intermediate groove 3k, which has an annular shape when the section thereof is viewed from the axial direction, and which is disposed in the plain portion 1y between adjacent main grooves 2c so as to intersect with the rotation axis D, as with the main groove 2c. And, as shown in FIG. 9(b), which is a sectional view taken along the K-K line in FIG. 9(a), the depth M4 of the intermediate groove 3k formed with a fixed width M3 is shallower than the depth M2 of the main groove 2c, thereby the outside diameter of the bottom surface of the intermediate groove 3k is larger than the bottom surface of the main groove 2c. According to the roll 3 having the intermediate groove 3k with such configuration, the following function and effects will be provided.

Figure 11:
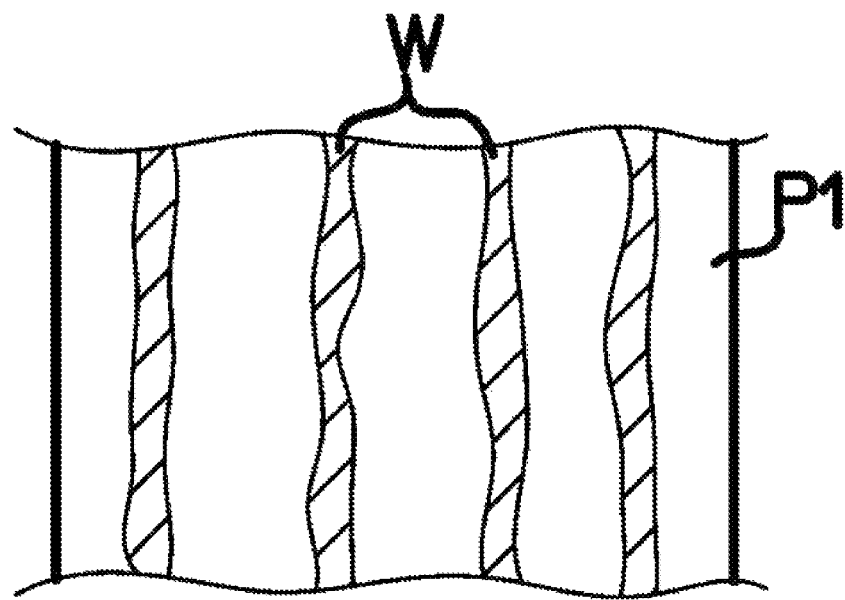
FIG. 11 is a conceptual diagram of streak mark.

In other words, as is well known, if a roll with which grooves are formed in the surface for prevention of occurrence of a slippage of the steel sheet is used for operation, as shown in FIG. 11, the steel sheet P1 after being coated may have had a streak mark W which is due to a difference in adhesion thickness of the molten coating metal, exhibiting practically no geometrical step height, but being optically identifiable. Such a streak mark W can be a problem with a coated steel sheet which is to be used for an automobile body or a home appliance, which is required to have a beautiful appearance, and the cause of occurrence thereof is considered to be that the thickness of the layer of the molten coating metal adhered to the surface of the steel sheet is larger in an area corresponding to the groove of the roll, while being smaller in an area corresponding to the plain portion. And, if the roll which is provided with the main groove 1c in the above-described first embodiment in which the fine groove 1e is formed or the roll in the second embodiment which is provided with the main groove 2c in which the fine groove 2e is formed is used for operation, the flow of the molten metal passing through the main groove 1c or the main groove 2c is made smooth, thereby the molten metal which has flown out from the main groove 1c or the main groove 2c tending to adhere thick and for a long period of time to the surface of the steel sheet which has left from the roll, and especially in the case of the fine groove 1e in the first embodiment that has a great streamline rectification effect for the molten metal, there being the possibility that the streak mark W may be more conspicuous.

Figure 9C:
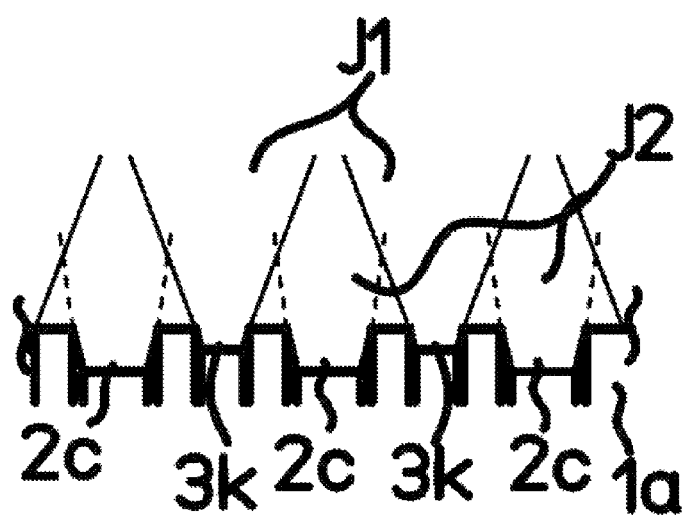
FIG. 9(c) is a conceptual diagram illustrating the state in operation of the roll for hot-dip metal coating bath in FIG. 9(a)
Figure 9D:
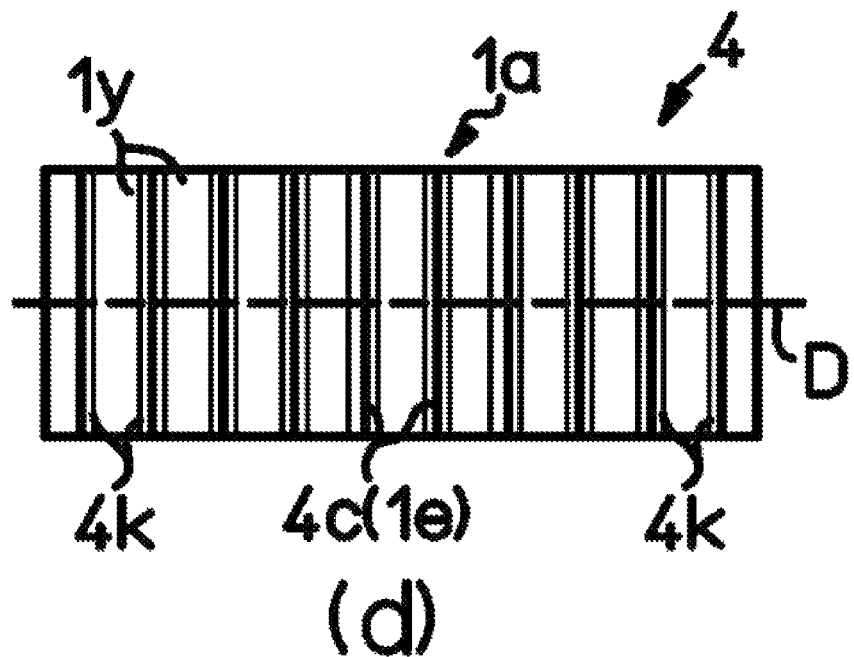
FIG. 9(d) is a front view of a body of a first variant of the roll for hot-dip metal coating bath in FIG. 9(a)
Figure 9E:
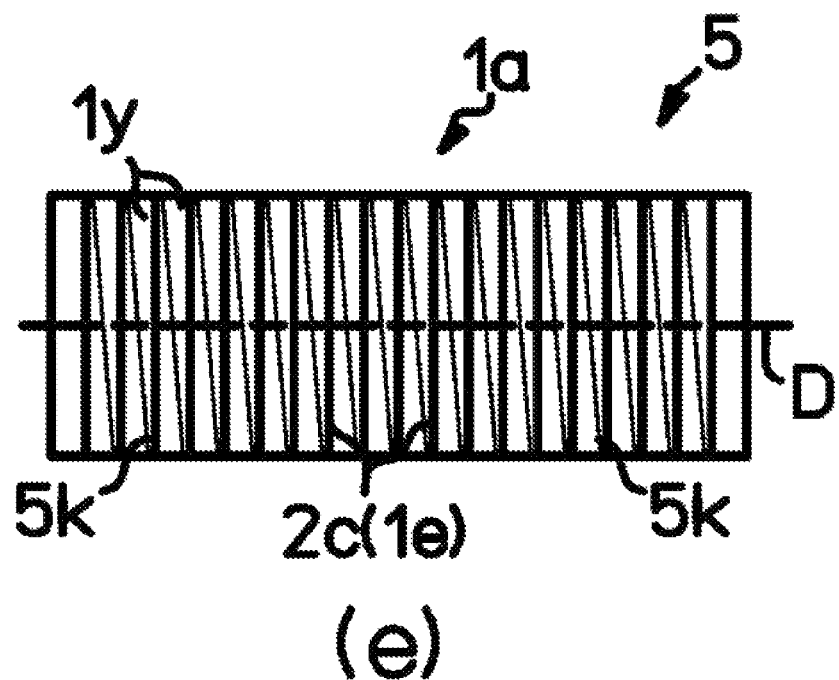
FIG. 9(e) is a front view of a body of a second variant of the roll for hot-dip metal coating bath in FIG. 9(a)

However, according to the roll 3 having the intermediate groove 3k configured as above, the flow velocity of the molten metal flowing out from the intermediate groove 3k, the outside diameter of the bottom surface of which is larger than that of the main groove 2c, is higher than the flow velocity of the molten metal flowing out from the main groove 2c. And, by providing the intermediate groove 3k for the plain portion 1y between adjacent main grooves 2c to thereby disposing the intermediate groove 3k adjacent to the main groove 2c, as shown in FIG. 9(c), which is a conceptual diagram illustrating the state of the grooves at the time of operation, the flow J1 of the molten coating metal that has flown out from the intermediate groove 3k, having a higher flow velocity in the range shown with solid lines in the figure is diverged, being changed into a turbulence, and comes into collision with the flow J2 of the molten coating metal that has flown out from the adjacent main groove 2c in the range shown with dashed lines in the figure, thereby stirring the flow J2 of the molten coating metal. Thus, with the flow J2 of the molten metal, which has flown out from the main groove 2c, being stirred, the thickness of the molten metal adhered to the steel sheet is reduced at an earlier stage, whereby occurrence of a streak mark can be suppressed.

Considering the above-described function and effects of the intermediate groove 3k, it can be the that the intermediate groove 3k need not be formed in all of the plain portions 1y between adjacent main grooves 2c, and, for example, may be formed only in a part of the roll, such as the middle portion or the end portion of the body 1a. Further, the number of rows of the intermediate groove 3k that are provided in one plain portion 1y is not limited, and as shown with thin lines in FIG. 9(d), which is a front view of the body 1a of a roll 4 as a first variant of the roll 3 shown in FIG. 9(a), in order to enhance the effect of suppression of occurrence of a streak mark, two rows of an intermediate groove 4k may be provided in one plain portion 1y such that each of them is disposed adjacent to the main groove 2c. Further, the intermediate groove 3k need not be formed annularly, and if it is formed in the shape of a circular arc only in a part of the body 1a when viewed from the axial direction, more preferably like a dashed line when viewed from the front, the effect of suppression of occurrence of a streak mark will be enhanced. Still further, from the same viewpoint, the intermediate groove 3k need not to have an identical depth M4 or width M3 everywhere, and the depth M4 may be partly changed to provide irregularities for the bottom surface, or the width M3 may be partly changed to provide an unevenness in width. In the case where the depth of the intermediate groove 3k is partly changed, the intermediate groove 3k may have a portion which is deeper than the depth M2 of the main groove 2c, provided that the depth M4 of the bottom surface which is shallower in the intermediate groove 3k is shallow, as compared to the main groove 2c.

Further, it is essential that the intermediate groove 3k be formed in the plain portion 1y between adjacent main grooves 2c. In other words, as shown with thin lines in FIG. 9(e), which is a front view of the body 1a of a roll 5 as a second variant of the roll 3 shown in FIG. 9(a), an intermediate groove 5k which is spiral may be provided in the plain portion 1y. By providing such a spiral intermediate groove 5k, the position in the axial direction of the flow of the molten coating metal flowing out from the intermediate groove 5k is varied with the rotation of the roll 4, whereby occurrence of a streak mark can be more effectively suppressed.

Fourth Embodiment

The configuration of a sink roll 6, which is a fourth embodiment of the present invention, being incorporated in the coating apparatus 80 in FIG. 2 in place of the sink roll 1 in the above-described first embodiment will be explained with reference to FIG. 10, which is a front view only of the body thereof.

Figure 10:
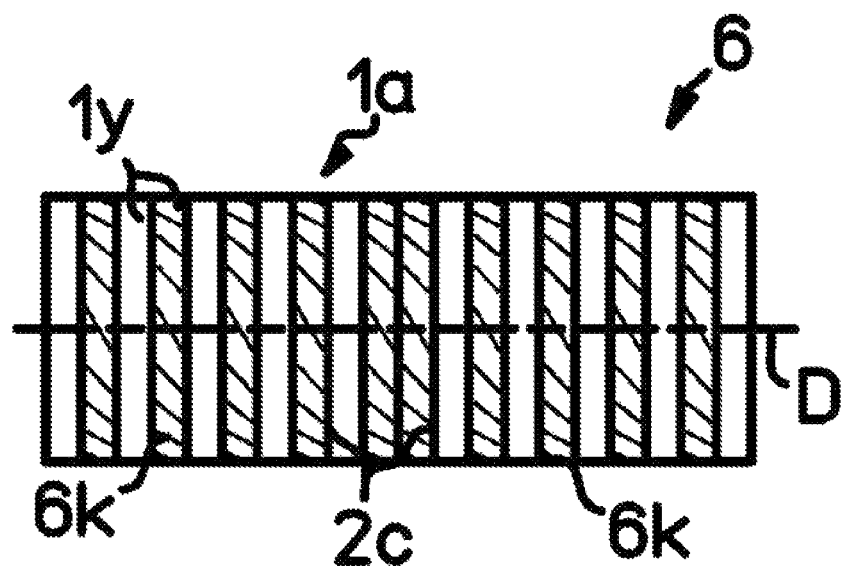
FIG. 10 is a front view of a body in a fourth embodiment of the roll for hot-dip metal coating bath in FIG. 2.

As shown in FIG. 10, the roll 6 in the fourth embodiment has a plurality of main grooves 2c which are formed in the body 1a in the axial direction, however, it is different from the roll 2 in the second embodiment in that it has an intermediate groove 6k shown with a thin line in the figure in a plain portion 1y provided between adjacent main grooves 2c, the angle at which the intermediate groove 6k crosses the rotation axis being different from that at which the main groove crosses the same, and a plurality of the intermediate grooves 6k being formed on the circumference. Also in the bottom surface of the main groove 2c in the present embodiment, the fine groove 1e along the longitudinal direction, which is provided for the roll 1 in the first embodiment, is formed.

Also with the roll 6 having such an intermediate groove 6k, the flow of the molten coating metal flowing out from the intermediate groove 6k stirs the flow of the molten coating metal flowing out from the main groove 2c, whereby occurrence of a streak mark can be effectively suppressed as with the roll 3 in the above-described third embodiment. The angle at which the intermediate groove 6k crosses the rotation axis D and the geometry thereof are not limited to those shown in the figure, and may be set as appropriated according to the operating conditions. In other words, the angles at which the plurality of intermediate grooves 6k provided on the circumference cross the rotation axis D, respectively, need not be identical, and may be varied depending upon the position on the circumference, and the sectional geometry and the plane shape may be set as appropriate.

With the rolls 3 to 6 in the above-described third and fourth embodiments, in which the intermediate groove is formed in the plain portion, in order not to stir the flow of the molten coating metal flowing in the main groove and yet to effectively drive out the molten coating metal and the sludge, it is preferable that the intermediate groove be provided, being not connected with the main groove.

[Method for Manufacturing of Roll 1 in First Embodiment]

The method for manufacturing the above-described roll 1 will be explained with reference to FIGS. 7 and 8.

The ceramic material which is used to form the above-described body 1a and the shaft portion 1b will be explained. With the roll in accordance with the present invention, only the body 1a is required to be always made of a ceramic material, and the shaft portion 1b may be formed of such a material as a metal or a resin, however, since the roll for hot-dip metal coating bath is used in a high-temperature atmosphere, or a corrosive atmosphere, it is preferable that, in order to prevent the roll from being fractured or eroded in service, all the members be formed of a ceramic material.

As the ceramic material, on the basis of the thermal shock resistance, the corrosion resistance, and others which are required to meet the operating conditions including the atmospheric conditions under which the roll is to be used, alumina, zirconia, silica and other oxide-based ceramic materials; zirconium boride, titanium boride, and other boride-based ceramic materials; silicon carbide, boron carbide, and other carbide-based ceramic materials; and inorganic materials, such as carbon, may be used. And, since the roll for hot-dip metal coating bath according to the present embodiment is subjected to rapid heating and cooling at the time of dipping it into the coating bath and withdrawing it therefrom, it must be excellent in thermal shock resistance. Therefore, as the ceramic material of which the roll for hot-dip metal coating bath is to be formed, silicon nitride, aluminum nitride, and other nitride-based ceramic materials, which have a high thermal conductivity, are preferable, and silicon nitride-based ceramic materials, which have a high erosion resistance and wear resistance to a molten coating metal, and are excellent in high-temperature strength, are particularly preferable. Hereinbelow, the silicon nitride ceramic material which is best suited for forming the roll for hot-dip metal coating bath will be explained in detail, however, the silicon nitride ceramic material itself may be the same as that disclosed in Japanese Unexamined Patent Application Publication No. 2001-335368.

The aluminum and oxygen existing in a silicon nitride ceramic material provide a phonon scattering source, thereby reducing the thermal conductivity. The silicon nitride ceramic material is constituted by silicon nitride grains and grain boundary phases surrounding them, and the aluminum and oxygen are contained in these phases. The aluminum ion has an ionic radius close to that of the silicon ion, and thus is easily dissolved into the silicon nitride grain. Dissolution of the aluminum ion lowers the thermal conductivity of the silicon nitride grain itself, resulting in the thermal conductivity of the silicon nitride ceramic material being remarkably lowered. Consequently, the content of aluminum in the silicon nitride ceramic material must be reduced as much as possible.

Most of the oxygen contained in an oxide which is added as a sintering aid exists in the grain boundary phases. To provide the silicon nitride ceramic material with an increased thermal conductivity, it is necessary to reduce the amount of grain boundary phases having a low thermal conductivity as compared to the silicon nitride grain. The lower limit of addition of the sintering aid is defined as the amount by which a sintered compact having a relative density of 8.5% or over can be obtained. It is required that, by reducing the addition of the sintering aid as much as possible in this range, the content of oxygen in the grain boundary phases be reduced.

If silicon nitride powder having a small content of oxygen is used as the raw material, the content of oxygen in the grain boundary phases can be reduced, thereby the amount of grain boundary phases per se can be reduced, which allows the sintered compact with a high thermal conductivity to be obtained, but a reduction in amount of $SiO_2$ produced in the sintering process makes the material sinter-resistant. However, if MgO, which is more excellent in sinterability than the other oxides, is used as a sintering aid, a sintered compact having a high density can be obtained with the addition of the sintering aid being reduced. As a result of this, the thermal conductivity of the sintered compact is dramatically increased.

Sintering aids which can be added together with magnesium include periodic table Group 3 elements (later described), such as Y, La, Ce, Nd, Pm, Sm, Eu, Gd, Dy, Ho, Er, Tm, Yb, and Lu. Among these, from the viewpoint of that the sintering temperature and pressure can be held to a point which is not too high, Y, La, Ce, Gd, Dy, and Yb are preferable.

The silicon nitride ceramic material to be used in the present invention has a thermal conductivity at room temperature of 50 W/(m·K) or over, and more preferably of 60 W/(m·K) or over. Therefore, the content of oxygen in the silicon nitride-based ceramic material is 5% by weight or under in order to obtain a thermal conductivity of 50 W/(m·K) or over, and is 3% by weight or under in order to obtain a thermal conductivity of 60 W/(m·K) or over. Further, the content of oxygen in the silicon nitride grain is 2.5% by weight or under in order to obtain a thermal conductivity of 50 W/(m·K) or over, and is 1.5% by weight or under in order to obtain a thermal conductivity of 60 W/(m·K) or over. Further, the content of aluminum in the silicon nitride-based ceramic material is 0.2% by weight or under in order to obtain a thermal conductivity of 50 W/(m·K) or over, and is 0.1% by weight or under in order to obtain a thermal conductivity of 60 W/(m·K) or over.

The total amount of the magnesium MgO equivalent and the periodical table Group 3 element oxide in the silicon nitride ceramic material is preferably 0.6 to 7% by weight. If the total amount is under 0.6% by weight, the relative density of the sintered compact is under 95%, which is insufficient. On the other hand, if the value of 7% by weight is exceeded, the amount of grain boundary phases having a low thermal conductivity will be excessive, thereby the thermal conductivity of the sintered compact being under 50 W/(m·K). The amount of MgO+Group 3 element oxide is more preferably 0.6 to 4% by weight.

The weight ratio of MgO to Group 3 element oxide is preferably 1 to 70, more preferably 1 to 10, and the most preferably 1 to 5. If the weight ratio of MgO to Group 3 element oxide is under 1, the percentage of the rare-earth element oxide in the grain boundary phases is too high, which makes the material sinter-resistant, thereby a sintered compact having a high density cannot be obtained. In addition, if the weight ratio of MgO to Group 3 element oxide exceeds 70, the diffusion of Mg at the time of sintering cannot be suppressed, resulting in the sintered compact surface having a color unevenness. If the weight ratio of MgO to $IIIA_2O_3$ is in the range of 1 to 70, sintering at 1650 to 1850° C. will provide a remarkably higher thermal conductivity. If the sintered compact is subjected to a heat treatment at 1800 to 2000° C., a still higher thermal conductivity can be obtained. The increase in thermal conductivity due to the heat treatment results from the growth of silicon nitride grains and the volatilization of MgO having a high vapor pressure.

The total amount of the aluminum, magnesium and periodical table Group 3 element in the silicon nitride grain is preferably 1.0% or under.

If the percentage of the type β silicon nitride grain having a short axis diameter of 5 μm or over among the type β silicon nitride grains in the silicon nitride sintered compact exceeds 10% by volume, the thermal conductivity of the sintered compact is improved, however, the coarse grains introduced into the structure act as the origin of fracture, thereby the fracture strength being substantially lowered, and a bending strength of 700 MPa or over cannot be obtained. Therefore, the percentage of the type β silicon nitride grain having a short axis diameter of 5 μm or over among the type β silicon nitride grains in the silicon nitride sintered compact is preferably 10% by volume or under. Likewise, in order to suppress the coarse grains introduced into the structure from acting as the origin of fracture, the aspect ratio of the type β silicon nitride grain is preferably 15 or under.

The silicon nitride ceramic material which forms the body 1a of the sink roll 1 is required to have a sufficient resistance to an abrupt temperature change. The resistance to an abrupt temperature change can be expressed by the following equation (1):

$$R = \alpha c(1-v)/E\alpha \tag{1}$$

where αc: four-point bending strength at room temperature (MPa), v: Poisson's ratio at room temperature, E: coefficient of Young at room temperature (MPa), and α: average thermal expansion coefficient from room temperature to 800° C., and the value of R is preferably 600 or over, and is more preferably 700 or over. If the value of R is under 600, there is the possibility that the roll may be fractured. The value of R is found from the four-point bending strength at room temperature αc (MPa), the Poisson's ratio at room temperature ν, the coefficient of Young at room temperature E (MPa), and the average thermal expansion coefficient from room temperature to 800° C. α which have been determined on a test piece cut from the roll.

Figure 7:
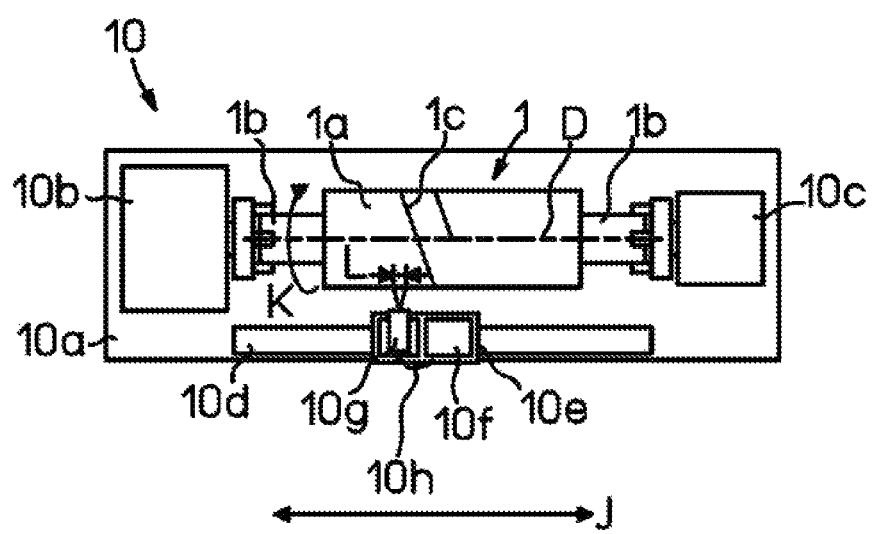
FIG. 7 is a schematic configuration diagram for an apparatus for manufacturing the roll for hot-dip metal coating bath in FIG. 3.

FIG. 7 is a plan view showing a schematic configuration of a manufacturing apparatus 10 for forming a groove 1c, 1d on the outer peripheral surface of a body 1a of a roll 1 having the body 1a which is formed of a ceramic material as described above. The manufacturing apparatus 10 is an apparatus for forming a groove 1c, 1d on the surface of the body 1a using a laser beam, and a method for manufacturing the roll 1 that will be explained below is a preferred method for forming the groove 1c, 1d using the manufacturing apparatus 10. However, the groove 1c, 1d may be formed by, for example, shot blasting or chemical etching with masking being provided along the groove 1c, 1d, grinding using a diamond forming wheel having a shape analogous to the sectional geometry of the groove 1c, 1d, and other various methods. In addition, the intermediate grooves 3k to 6k described above may be formed in the same manner.

In the manufacturing apparatus 10 shown in FIG. 7 that is forming the groove 1c, the reference numeral 10a denotes a base, and the reference numeral 10b a rotation unit which is disposed at the left end of the top of the base 10a for holding the end of one shaft portion 1b of the roll 1 and rotating the roll 1 in the direction of the arrow K around the axis D of the roll 1. The revolution speed of the roll 1 that is given by the rotation unit 10b can be optionally set by means of a control unit (not shown), being controlled such that the body 1a is stably rotated at a relatively low circumferential speed.

The reference numeral 10c denotes a driven unit which is disposed opposite to the rotation unit 10b along the axial direction of the roll 1. The driven unit 10c holds the other shaft portion 1b of the roll 1, and rotates, following the rotation of the rotation unit 10a. In this way, the rotation unit 10b and the driven unit 10c constitute a roll rotation system which rotatably supports the roll 1, and provides a rotation force for the roll 1 to rotate around the axis D of the roll 1 in the direction of the arrow K.

In FIG. 7, the reference numeral 10d denotes a guide unit (guide) which is disposed in parallel to the axis D of the roll 1, and the reference numeral 10e denotes a traveling unit which horizontally moves in the direction of the arrow indicated with a symbol of J, being guided by the guide unit 10d. The traveling unit 10e is driven by a driving unit incorporated in the manufacturing apparatus 10, being horizontally moved under highly accurate positioning control performed by the control unit. In other words, the guide unit 10d and the traveling unit 10e constitute a horizontal movement system.

The roll rotation system and the horizontal movement system can be appropriately configured by utilizing, for example, such a machine as a lathe or cylindrical grinding machine which is operated under numerical control. In other words, the roll rotation system can be configured with the headstock and the tail stock, and the horizontal movement system can be configured with the carriage (tool slide). However, the roll rotation system may be configured by preparing two sets of a pair of rollers the outer peripheral surfaces of which are opposed to each other, using one set as a rotation unit and the other set as a driven unit, and attaching a motor for roll rotation to the rotation unit, and the horizontal movement system may be configured by utilizing a linear guide.

In FIG. 7, the reference numeral 10g denotes a laser beam irradiation unit for irradiating a fiber laser beam that is disposed in the traveling unit 10e, and is connected, through an optical fiber cable 10h, to a laser oscillating unit 10f which is also disposed in the traveling unit 10e. The laser irradiating unit 10g which irradiates one beam of laser light passed through an optical system, including a mirror and a lens, from the distal end is disposed such that the central axis of the optical system is orthogonal to the axis D of the roll 1, and the laser beam spot is positioned on the outer peripheral surface of the body 1a. And, the laser irradiating unit 10g in the present embodiment incorporates a galvanometer mirror, which polarizes the laser beam to change the scanning position within the range L in the figure with respect to the central axis of the optical system, and thus can change the irradiation position with no need for moving the traveling unit 10e. As described above, the laser irradiating unit 10g, the optical fiber cable 10h and the laser oscillating unit 10e constitute a laser irradiation system in which the laser beam generated in the laser oscillating unit 10f is supplied to the laser irradiating unit 10g through the optical fiber cable 10h, and from the distal end of the laser irradiating unit 10g, is irradiated toward the outer peripheral surface of the body 1a. The laser oscillating unit 10f is connected to the control unit through an electrical communication circuit, the laser beam output, the pulse duration, the amount of defocusing, and other conditions being controlled by the control unit.

The above-described laser irradiation system is configured so as to irradiate a fiber laser beam having a wavelength of 1070 nm, however, the laser used may be selected from the YAG laser, the $CO_2$ laser, the semiconductor laser, and other lasers having various wavelengths in consideration of such factors as the optical properties (laser beam absorptivity and reflectivity), the thermal properties (melting point, thermal conductivity, and specific heat), the mechanical properties (strength and toughness) of the ceramic material forming the body 1a, the geometry and dimensions of the groove 1c to be formed. However, as later described in detail, in order to form fine grooves in the groove 1c, it is desirable to use a fiber laser having a high laser beam absorptivity particularly on the surface of a ceramic material (for example, manufactured by IPG Photonics, Model YLP-2/500/50). By utilizing the fiber laser, although the beam diameter at the laser beam spot is extremely small (for example, when a condenser lens of focal length f=100 mm is incorporated in the laser irradiating unit 10g, the beam diameter at the laser beam spot will be 90 μm), thereby the beam having a low energy as a whole, it is possible to form the groove 1c at a high efficiency with the energy density at the laser beam spot being enhanced, while the thermal effect being suppressed.

For removing the dust produced by the laser machining, a nozzle for supplying an assist gas, such as air or oxygen, which is an oxidation gas, or argon gas or nitrogen gas, which is a non-oxidation gas, may be provided in the area in the vicinity of the groove 1c onto which the laser beam is irradiated, to thereby purge that area with the assist gas.

According to the manufacturing apparatus 10 described above, a spiral groove 1c can be formed by using the rotation unit 10b in the roll rotation system to rotate the roll 1 at a constant circumferential speed, moving the traveling unit 10e in the horizontal movement system under the control to provide a feed rate which is established by the circumferential speed and the inclination angle of the spiral for the groove 1c, and irradiating the laser beam onto the body 1a from the laser irradiation system.

Figure 8A:
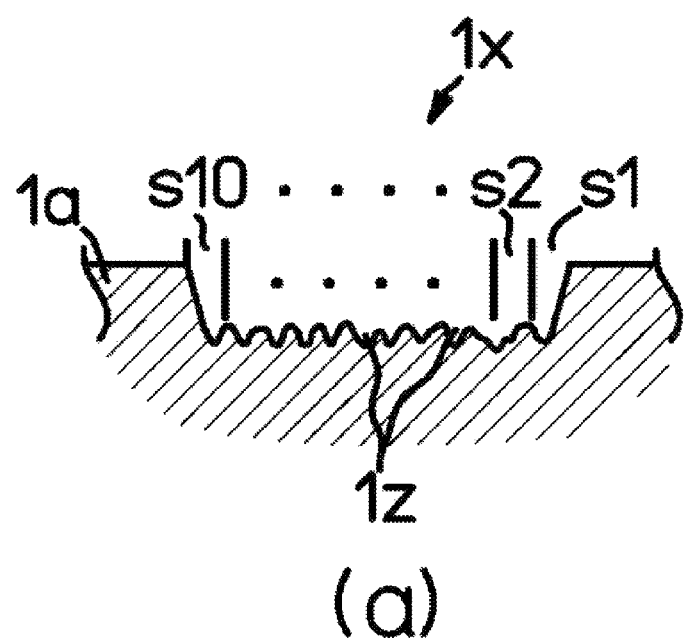
FIG. 8(a) is a sectional view illustrating the step for forming a first groove in the roll for hot-dip metal coating bath by using the manufacturing apparatus in FIG. 7.
Figure 8B:
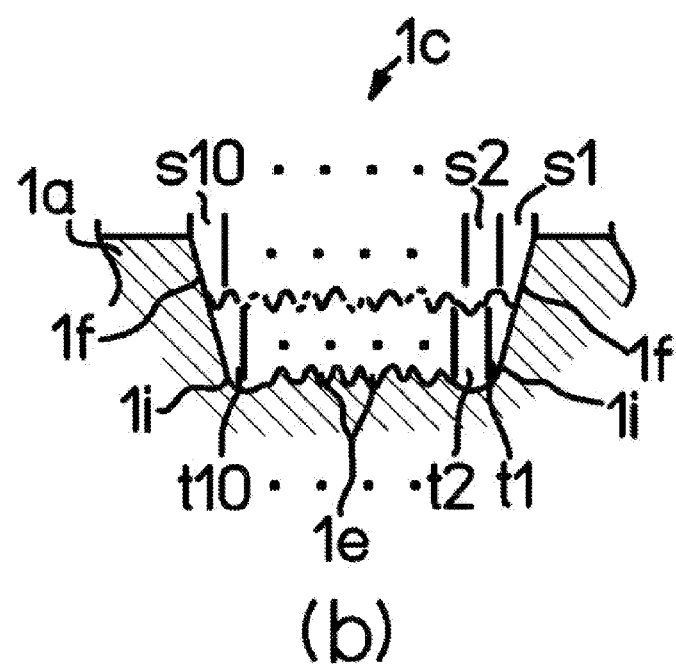
FIG. 8(b) is a sectional view illustrating the step for forming a second groove in the roll for hot-dip metal coating bath by using the manufacturing apparatus in FIG. 7.
Figure 8C:
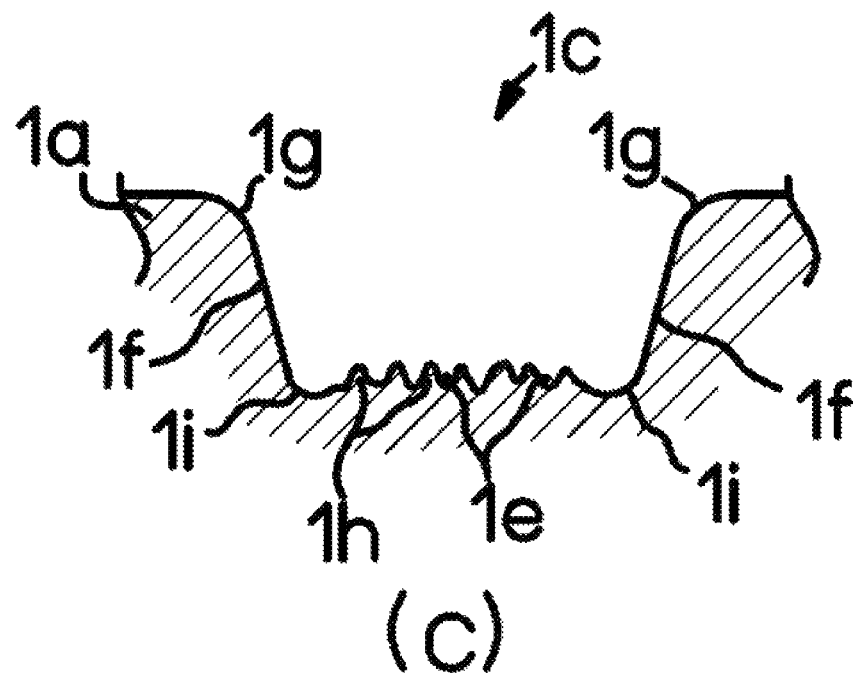
FIG. 8(c) is a sectional view showing the state of the second groove in FIG. 8(b) that has been subjected to shot blasting after the formation step.

Hereinbelow, a method for forming the groove 1c with the manufacturing apparatus 10 will be explained with reference to FIG. 8. FIGS. 8(a) to 8(c) are each a sectional view taken along the line A-A in FIG. 4(a), illustrating the groove forming process in the respective steps explained below. With the manufacturing method according to the present embodiment, a second groove 1c which is formed in the step shown in FIG. 8(b) provides the groove 1c which is to be formed in the body 1a.

First, the setup step is taken. A blank for the roll 1 that has been prepared is held by the rotation unit 10b and the driven unit 10c with the axis D being positioned so as to coincide with the rotation center of the rotation unit 10b and the driven unit 10c. Next, in order to position the laser beam irradiated from the distal end of the laser irradiating unit 10g in the horizontal direction, the traveling unit 10e is moved such that the laser beam is irradiated toward the center of the body 1a in the axial direction, and thereby the current position of the rotation unit 10b (body 1a) in the rotation direction and the current position of the traveling unit 10e in the horizontal direction are established as the machining datum point. Then, the automatic control for the manufacturing apparatus 10 is activated. In the control unit (not shown) for controlling the manufacturing apparatus 10, there have been previously stored the revolution speed for the blank for the roll 1; the feed rate per revolution of the roll for the traveling unit 10e that is established by the revolution speed and the inclination angle of the spiral for the groove 1c; the number of repetition times and the amount of offset, which is later described; the laser machining conditions, and other information necessary for conducting the machining.

Next, the first groove formation step is taken. In the first groove formation step, as shown in FIG. 8(a), since the spot diameter of the laser beam is extremely small with respect to the width of the first groove 1x to be formed, the blank for the roll 1 is rotated while the laser beam is irradiated onto the body 1a along a plurality of first scanning lines s1 to s10 to thereby form the first groove 1x. In other words, the manufacturing apparatus 10 positions the rotation unit 10b and the traveling unit 10e such that the laser beam is irradiated onto the machining datum point, and drives the rotation unit 10b and the traveling unit 10e such that the revolution speed and the feed rate which are set are provided. Next, the manufacturing apparatus 10 uses the machining datum point as the starting point to irradiate the laser beam onto the outer peripheral surface of the body 1a to the end point along the scanning line s1 set at the right end in FIG. 8(a) to thereby form one row of a spiral fine groove 1z having a narrow width in the body 1a. After the machining along this scanning line s1 having been completed, the manufacturing apparatus 10 stops the irradiation of the laser beam, returning the rotation unit 10b (body 1a) to the machining datum point, and positions the traveling unit 10e in the horizontal direction such that the laser beam is irradiated in the position of the next scanning line s2. Thereafter, the laser beam is irradiated along the scanning line s2 to form one row of the fine groove 1z in the position adjacent in the crosswise direction to the fine groove 1z formed by the laser beam irradiation along the scanning line s1. And, the same machining operation as that described above is repeated the number of repetition times (ten times from the scanning lines s1 to s10 in the case of the present embodiment) that is determined from the relationship between the diameter of the laser beam spot and the width of the first groove 1x, and is previously stored in the control unit, to thereby accumulate a plurality of rows of the fine groove 1z along the crosswise direction for forming the spiral first groove 1x in the body 1a. The diameter of the above-mentioned laser beam spot is the diameter as defined in JIS C 6180 "Measuring methods for laser output power", in other words, "a maximum distance between points where the optical power density falls to $e^{-2}$ times the maximum value in the beam". The diameter of such laser beam spot can be measured by using a beam profiler (for example, manufactured by Ophir Optronics Solutions Ltd., Model BA-100).

Following the first groove formation step described above, the second groove formation step for forming a second groove 1c which is deeper than the first groove 1x is taken. In the second groove formation step, in basically the same manner as in the first groove formation step, the laser beam is irradiated onto the bottom surface of the first groove 1x along second scanning lines t1 to t10 which are set based on the number of repetition times that is stored in the control unit, to thereby accumulate a plurality of rows of a fine groove 1e that are formed in the positions adjacent to one another along the crosswise direction for forming the second groove 1c, however, the first scanning lines s1 to s10 and the second scanning lines t1 to t10 are set such that they differ in disposition and will not be overlapped one upon another.

Specifically, in order to provide the second scanning line t1 with a position slightly offset in a leftward direction with respect to the first scanning line s1 set at the right end of the first groove 1x in the crosswise direction, the manufacturing apparatus 10 corrects the position of the machining datum point in the horizontal direction by the amount of offset stored in the control unit to provide a new machining datum point. And, the manufacturing apparatus 10 positions the rotation unit 10b and the traveling unit 10e such that the laser beam is irradiated onto this new machining datum point, and drives the rotation unit 10b and the traveling unit 10e such that the revolution speed and the feed rate which are set are provided. Positioning in the horizontal direction to the new machining datum point may be performed by scanning the laser beam with a galvanometer mirror. Next, the manufacturing apparatus 10 uses the new machining datum point as the starting point to irradiate the laser beam onto the outer peripheral surface of the body 1a to the end point along the scanning line t1 set at the right end to thereby form one row of the spiral fine groove 1e having a narrow width in the body 1a. And, the same machining operation as that described above is repeated the number of repetition times (ten times from the scanning lines t1 to t10 in the case of the present embodiment) that is previously stored in the control unit, to thereby accumulate a plurality of rows of the fine groove 1e along the crosswise direction for forming the spiral second groove 1c in the body 1a. On the surface of the second groove 1c which has been thermally machined by the laser, a glass phase is formed.

Also outside the range of the laser beam spot diameter determined by the method described above, the laser beam is irradiated, although the energy density thereof is low, and therefore, on both sides of the second groove 1c, side walls 1f are formed which are inclined, being flared toward the aperture. Further, in order to form a side wall 2f having shouldered portions shown in FIG. 6(c), the laser beam may be irradiated, while being scanned with a galvanometer mirror, upon the laser beam being irradiated along the scanning lines t1 and t10.

Radiused surfaces 1i which are disposed as a preferable element at the corners of the groove 1c in the present embodiment are appropriately formed by lowering the energy density at the laser beam spot of the laser beam irradiated on the scanning line t1, t2 at the right end and the scanning line t9, t10 at the left end than that on the scanning lines t3 to t8. In order to lower the energy density at the laser beam spot, the output itself of the laser beam may be lowered, or the position of the laser beam spot may be shifted upward or downward (defocused) to enlarge the irradiation diameter of the laser beam at the outer peripheral surface of the body 1a.

Following the second groove formation step described above, the shot blasting step is desirably performed for rectifying the bottom surface of the second groove 1c. As the media for shot blasting, various grains made of a metallic or ceramic material may be used. By performing the shot blasting step, as shown in FIG. 8(c), a substantially plain surface or a substantially semispherical surface can be formed on the top of the convex portion 1h between adjacent fine grooves 1e. Further, the radiused surface 1i of the second groove 1c which has been formed in the second groove formation step described above may be adapted to be a still smoother curved surface, and a connection surface 1g can be formed which is interposed between the plain surface 1y of the body 1a and the side wall 1f.

Hereinabove, the roll manufacturing method for forming the groove 1c, 1d of the roll 1 in the first embodiment that is shown in FIG. 4 has been explained. In the case where the groove 2c of the roll 2 in the second embodiment that is shown in FIG. 6 is to be formed, the scanning directions for the first scanning line and the second scanning line are in parallel to the rotation axis D, unlike those for the groove 1c, 1d in the first embodiment, however, the first groove formation step and the second groove formation step can be applied in the same manner as that described above. In other words, in the case where a plurality of rows of the groove 2c is to be formed in a blank for the roll 2, the manufacturing apparatus 10 shown in FIG. 7 is loaded with the blank for the roll 2 shown in FIG. 6, and then rotates it, irradiating the laser beam onto the outer peripheral surface of the body 1a along the first scanning line set in parallel to the rotation axis D by the length of the groove width for forming the first groove (the first groove formation step), and further rotates the blank for the roll 2 to irradiate the laser beam onto the bottom surface of the first groove along the second scanning line set in parallel to the rotation axis D so as to have a disposition different from that of the first scanning line by the length of the groove width for forming the second groove (the second groove formation step) to thus form one row of the groove 2c. Next, the laser beam is positioned in the horizontal direction such that the irradiation can be performed for the subsequent one row of the groove 2c, to thereby form the subsequent groove 2c in the same manner as that described above. By repeating such operation, a plurality of rows of the groove 2c can be formed.

Here, in the case where the groove 2c is to be formed in the blank for the roll 2 in the second embodiment, the machining datum point may be set such that the spot of the laser beam which is to be irradiated from the laser irradiating unit 10g in the direction orthogonal to the axis D is positioned at the center of the groove 2c in the crosswise direction, and the laser beam may be scanned with a galvanometer mirror in the horizontal direction along the first scanning line and the second scanning line set in parallel to the axis D by the irradiation lengths corresponding to the widths of the first groove and the second groove for forming the first groove and the second groove. In this case, in order to make the first scanning line and the second scanning line to be different in disposition, the circumferential speed (revolution speed) of the body may be set such that it is different between the first groove formation step and the second groove formation step.

Examples

Hereinbelow, the present invention will be explained with the use of specific examples.

Roll blanks which are made of a silicon nitride-based ceramic material as described above, and have a body diameter of 750 mm, and a length of 1800 mm were prepared, and by the above-described manufacturing method using the laser machining, rolls having various grooves, fine grooves, and intermediate grooves, and meeting various specifications as shown in Table 1 were manufactured. For the groove 1c of the roll 1 shown in FIG. 3, the specified width was 5 mm, the specified depth 3 mm, and the specified pitch of the spiral in the axial direction 50 mm. For the groove 2c of the roll 2 shown in FIG. 5, the specified width was 3.5 mm, the specified depth 1 mm, and the specified pitch in the axial direction 15 mm. In any example, the specified width of the plain portion was 5 mm.

Except for Example 22, the groove after the laser machining was sufficiently subjected to shot blasting to remove the glass phase formed on the bottom surface, and only for Example 22, after the laser machining, the laser beam, which was defocused, was again irradiated to form a glass phase on the bottom surface. Further, for the grooves other than that in Example 21, the side walls of which are not inclined, the specified angle of the side wall crossing with vertical line was 30°, and for Example 21, where the side walls are not inclined, a groove the side walls of which are not inclined was formed by grinding, and then fine grooves were formed by laser machining only in the bottom surface of the groove. Further, for the groove in Example 17, where the inclined side walls crossing with the vertical line at 30° have shouldered portions, the specified number of shouldered portions was 3. In Example 19, where the intermediate grooves having a geometry in FIG. 9(a) were formed, the specified width of the intermediate groove was 2 mm, and the specified depth was 0.5 mm, with the intermediate groove being disposed in the respective plain portions. Further, in Example 20 where the intermediate grooves having a geometry in FIG. 10 were formed, the specified width of the intermediate groove was 0.5 mm, the specified depth 0.2 mm, the specified length 10 mm, and the specified angle at which the intermediate groove crosses the rotation axis was 45°, with 47 rows of the intermediate groove being disposed in the respective plain portions at an equal angle. Further, the groove in Example 23 was formed by grinding, and no fine grooves were formed.

Table 1 gives the results of the use of the rolls in the respective Examples described above in manufacturing of zinc-coated steel sheets as defined by JIS G 3302 "Hot-dip zinc-coated steel sheets and coils". The rankings and criteria for various evaluation items, such as percentage of occurrence of slippage, and dross adhesion, are as follows:

(1) Percentage of occurrence of slippage
  A (excellent): 0%
  B (good): 1 to 10%
  C (fair): 11 to 30%
  D (poor): 31% or over
(2) Percentage of occurrence of dross adherence
  A (excellent): 0%
  B (good): 1 to 10% of length of steel sheet in the longitudinal direction
  C (fair): 11 to 30% of length of steel sheet in the longitudinal direction
  D (poor): 31% or over of length of steel sheet in the longitudinal direction
(3) Streak mark A (excellent): No streak mark has occurred
B (good): Streak mark has occurred only under some operating conditions
C (fair): Light streak mark has occurred continuously over the overall length of steel sheet in the longitudinal direction
D (poor): Clear streak mark occurred continuously over the overall length of steel sheet in the longitudinal direction
(4) Roll fracture
A (excellent): No cracks initiated
C (fair): Shallow crack has initiated in some grooves
D (poor): Deep crack has initiated in all grooves

TABLE 1

|  | Roll Groove Specifications | | | | | | | | Evaluation Item | | | |
| --- | --- | --- | --- | --- | --- | --- | --- | --- | --- | --- | --- | --- |
|  | Groove | | | | Fine Groove | | | | Dross | | | |
|  | Groove Geometry | Side Wall Indirection | Side Wall Shoulder | Glass Phase | Plain Portion Width (mm) | Geometry | Apert. Width (G1) (μm) | Depth (H) (μm) | Interm. Groove Geometry | Slippage Occurrence Percentage | Adherence Occurrence Percentage | Streak Mark | Roll Fracture |
| Ex. 1 | FIG. 5 | Given | Not g. | Not g. | 5.0 | FIG. 4 | 600 |  | Not g. | C | B | C | D |
| Ex. 2 | FIG. 5 | Given | Not g. | Not g. | 5.0 | FIG. 4 | 500 |  | Not g. | B | B | C | C |
| Ex. 3 | FIG. 5 | Given | Not g. | Not g. | 5.0 | FIG. 4 | 300 |  | Not g. | A | B | C | A |
| Ex. 4 | FIG. 5 | Given | Not g. | Not g. | 5.0 | FIG. 4 | 100 |  | Not g. | A | B | C | A |
| Ex. 5 | FIG. 5 | Given | Not g. | Not g. | 5.0 | FIG. 4 | 50 |  | Not g. | B | B | C | A |
| Ex. 6 | FIG. 5 | Given | Not g. | Not g. | 5.0 | FIG. 4 | 40 |  | Not g. | C | C | C | A |
| Ex. 7 | FIG. 5 | Given | Not g. | Not g. | 5.0 | FIG. 6 |  | 250 | Not g. | B | B | B | D |
| Ex. 8 | FIG. 5 | Given | Not g. | Not g. | 5.0 | FIG. 6 |  | 200 | Not g. | A | B | B | C |
| Ex. 9 | FIG. 5 | Given | Not g. | Not g. | 5.0 | FIG. 6 |  | 150 | Not g. | A | B | B | A |
| Ex. 10 | FIG. 5 | Given | Not g. | Not g. | 5.0 | FIG. 6 |  | 80 | Not g. | A | B | B | A |
| Ex. 11 | FIG. 5 | Given | Not g. | Not g. | 5.0 | FIG. 6 |  | 30 | Not g. | B | B | B | A |
| Ex. 12 | FIG. 5 | Given | Not g. | Not g. | 5.0 | FIG. 6 |  | 20 | Not g. | C | C | B | A |
| Ex. 13 | FIG. 3 | Given | Not g. | Not g. | 5.0 | FIG. 4 | 500 |  | Not g. | B | B | C | C |
| Ex. 14 | FIG. 3 | Given | Not g. | Not g. | 5.0 | FIG. 4 | 50 |  | Not g. | B | B | C | A |
| Ex. 15 | FIG. 3 | Given | Not g. | Not g. | 5.0 | FIG. 4 |  | 200 | Not g. | B | B | B | C |
| Ex. 16 | FIG. 3 | Given | Not g. | Not g. | 5.0 | FIG. 4 |  | 30 | Not g. | B | B | B | A |
| Ex. 17 | FIG. 5 | Given | Given | Not g. | 5.0 | FIG. 4 | 500 |  | Not g. | A | B | C | A |
| Ex. 18 | FIG. 5 | Given | Not g. | Not g. | 5.0 | FIG. 4 | 500 |  | FIG. 9a | B | B | A | A |
| Ex. 19 | FIG. 5 | Given | Not g. | Not g. | 5.0 | FIG. 4 | 500 |  | FIG. 10 | B | B | A | A |
| Ex. 20 | FIG. 5 | Not g. | Not g. | Not g. | 5.0 | FIG. 4 | 500 |  | Not g. | C | B | C | A |
| Ex. 21 | FIG. 5 | Not g. | Not g. | Given | 5.0 | FIG. 4 | 500 |  | Not g. | B | A | C | A |
| Ex. 22 | FIG. 5 | Given | Not g. | Not g. | 5.0 | No Fine Grooves Given | | | Not g. | D | C | C | A |

According to the Examples 1 to 22 given above, the following findings have been obtained. In other words, with the roll in which grooves having a geometry in FIG. 5 are formed, Examples 1 to 21 where fine grooves were formed gave an improvement in percentage of occurrence of slippage and that of dross adherence, compared to Example 22 where no fine grooves were formed. Further, in Examples 2 to 5, where the fine grooves have a geometry shown in FIG. 4 and an aperture width of 50 to 500 μm were formed, or, in Examples 8 to 11, where the fine grooves have a geometry shown in FIG. 6 and a depth of 30 to 200 μm, a further improvement was provided for the respective evaluation items including percentage of occurrence of slippage. By referring to Examples 12 to 16, it was confirmed that this same effect is also obtained with the rolls in which the grooves in FIG. 3 were formed. In addition, by referring to Example 17 where grooves having shoulders on the inclined side walls were formed, it was confirmed that the percentage of occurrence of slippage is further improved, as compared to that in Example 2. In addition, by referring to Example 18, 19 where intermediate grooves having a geometry shown in FIG. 9(a) or FIG. 10 were formed, there was a substantial improvement in occurrence of a streak mark, when compared to Example 2. Further, even for Example 20 where grooves having side walls which are not inclined were formed, it could be confirmed that the fine grooves provide an advantage over the grooves in Example 22. Further, by referring to Example 21 where a glass phase was formed on the bottom surface of the groove, it was confirmed that the glass phase is effective against the occurrence of slippage and dross adherence.

DESCRIPTION OF SYMBOLS

The reference numeral 1 (2 to 6) denotes a sink roll; 1a a body; 1b a shaft portion; 1c (1d, 2c) a groove; 1e (2e) a fine groove; 1f a side wall; 1g a connection surface; 1h a convex portion; 1i a radiused surface; 1y a plain surface; 3k (4k to 6k) an intermediate groove; 9 a support roll; 10 a manufacturing apparatus; 10b a rotation unit; 10c a driven unit; 10d a guide unit; 10e a traveling unit; and 10g a laser beam irradiation unit.

The invention claimed is:

1. A roll for advancing a steel sheet in a hot-dip metal coating bath comprising a cylindrical body having an outer peripheral surface made of ceramic material, with a coarse groove having a spiral shape or an annular shape crossing a direction along a rotation axis of the roll and formed on the outer peripheral surface, for advancing a steel sheet while rotating in a hot-dip metal coating bath with the outer peripheral surface of said roll in contact with both the hot-dip metal coating bath and with the steel sheet,
   a plurality of rows of fine grooves are formed in parallel along a longitudinal direction of the coarse groove on a bottom surface of the coarse groove, wherein
   each of the fine grooves has an aperture width of 50 to 500 μm and said coarse groove has a width greater than the combined width of said plurality of rows of fine grooves.

2. The roll for hot-dip metal coating bath according to claim 1, wherein the coarse groove has inclined side walls flaring toward an aperture direction thereof in a sectional view along a crosswise direction of the coarse groove.

3. The roll for hot-dip metal coating bath according to claim 1, wherein, a lasered glass surface is formed on the surface of the coarse groove.

4. The roll for hot-dip metal coating bath according to claim 1, wherein the top surface of a convex portion between adjacent two of the fine grooves is a substantially plain surface or a substantially semispherical surface.

5. The roll for hot-dip metal coating bath according to claim 1, wherein, a cross sectional shape of the coarse groove along a crosswise direction of it is substantially rectangular, substantially triangular, substantially letter-U, or substantially trapezoidal,
   a plurality of said coarse grooves are formed in a direction along the rotation axis,
   a plain portion is formed between adjacent two of the coarse grooves, and
   a width of the plain portion along the crosswise direction is 3 mm or over.

6. The roll for hot-dip metal coating bath according to claim 1,
   wherein a plurality of said coarse grooves are formed in a direction along the rotation axis, and
   a plain portion with an intermediate groove which is shallower than the coarse groove is formed between adjacent two of the coarse grooves.

7. The roll for hot-dip metal coating bath according to claim 1, wherein a plurality of the coarse grooves are formed in a direction along the rotation axis, and between adjacent two of the coarse grooves, a plain portion is formed, with a plurality of intermediate grooves which are different from the coarse groove in angle at which to cross with the rotation axis being formed on the circumference in said plain portion.

8. The roll for hot-dip metal coating bath according to claim 1, wherein the ceramic material is a silicon nitride-based ceramic material.

* * * * *